United States Patent [19]

Borup et al.

[11] Patent Number: 5,155,727
[45] Date of Patent: Oct. 13, 1992

[54] METHOD OF COUPLING A DATA TRANSMITTER UNIT TO A SIGNAL LINE AND APPARATUS FOR PERFORMING THE INVENTION

[75] Inventors: Gottlob Borup, Gravinge, Denmark; Flemming H. Pedersen, Soto Del Res, Spain

[73] Assignee: Bolt, Beranek and Newman, Inc., Cambridge, Mass.

[21] Appl. No.: 453,107

[22] Filed: Dec. 18, 1989

Related U.S. Application Data

[63] Continuation of Ser. No. 174,930, filed as PCT/DK87/00070, Jun. 9, 1987, abandoned.

[30] Foreign Application Priority Data

Jun. 9, 1986 [DK] Denmark ............................ 2695/86

[51] Int. Cl.$^5$ ........................... H04J 3/22; H04J 3/06; H04L 12/40
[52] U.S. Cl. .................................. 370/85.3; 370/85.1; 370/100.1; 370/108
[58] Field of Search ...................... 370/85.1, 85.2, 85.3, 370/85.15, 100.1, 108, 105.4, 111, 85.12, 29, 77, 101; 375/107, 111; 340/825.5

[56] References Cited

U.S. PATENT DOCUMENTS

| | | | |
|---|---|---|---|
| 4,002,842 | 1/1977 | Meyr | 370/85.15 |
| 4,090,035 | 5/1978 | Popkin | 370/29 |
| 4,199,663 | 4/1980 | Herzog | 370/108 |
| 4,471,481 | 9/1984 | Shaw et al. | 370/101 |
| 4,562,573 | 12/1985 | Murano et al. | 370/108 |
| 4,698,804 | 10/1987 | Flores et al. | 340/825.5 |
| 4,727,370 | 2/1988 | Shih | 340/825.14 |

FOREIGN PATENT DOCUMENTS 0094660 11/1983 European Pat. Off. .

Primary Examiner—Douglas W. Olms
Assistant Examiner—H. Kizou
Attorney, Agent, or Firm—Lowe, Price, LeBlanc & Becker

[57] ABSTRACT

A method for controlling the access of a data transmitter unit to a signal line, enabling approximately full utilization of the bandwidth of the signal line for data transfer, avoidance of collisions, conveyance of the transmitted data amount independently of the signal line length, and ensuring access to the signal line when the unit is to transmit. An apparatus for performing the method, comprising an input (1) and an output (2), a delay unit (3), a data transmitter unit (4) and an activation circuit (5).

13 Claims, 5 Drawing Sheets

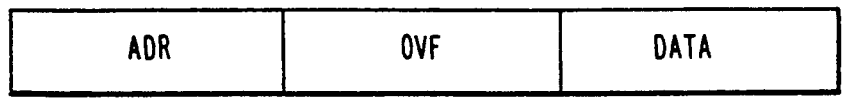
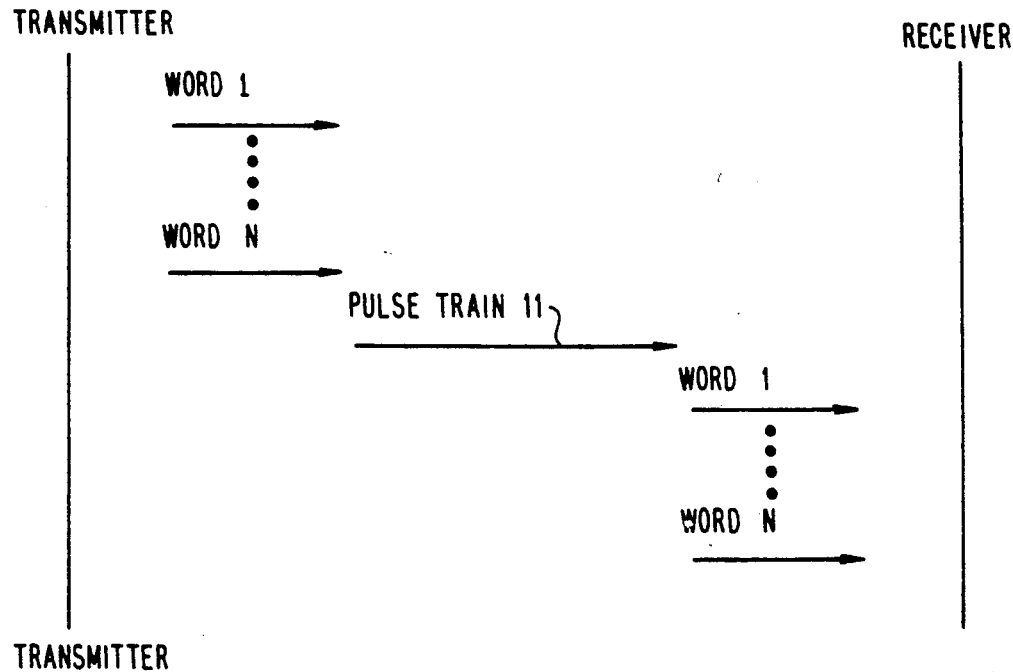
FIG. 4
FIG. 5
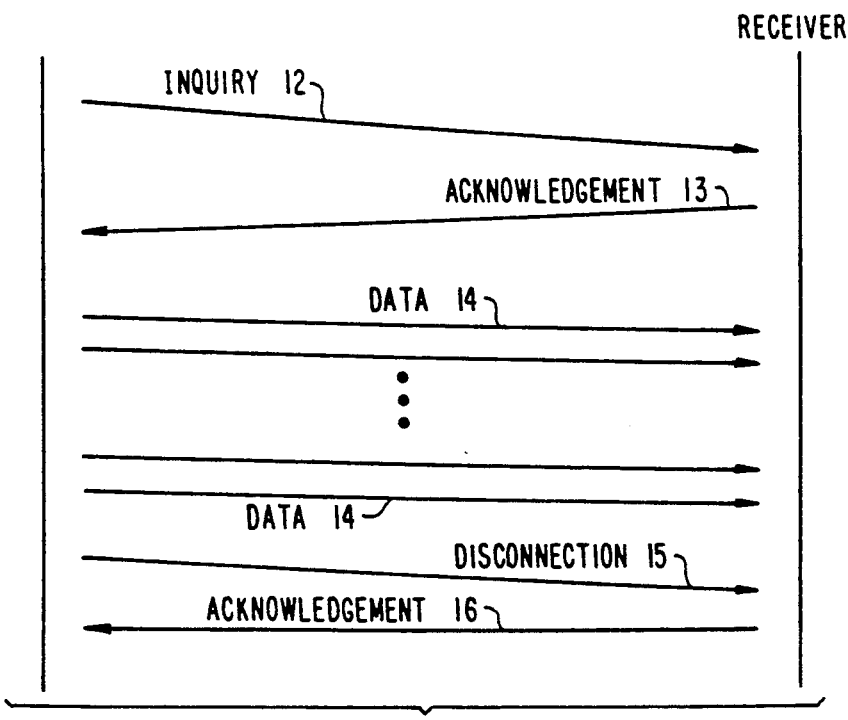
FIG. 6

METHOD OF COUPLING A DATA TRANSMITTER UNIT TO A SIGNAL LINE AND APPARATUS FOR PERFORMING THE INVENTION

This application is a continuation-in-part of Application Ser. No. 07/174,930 filed as PCT/DK87/00070, Jun. 9, 1987, now abandoned.

When data transmitter units are coupled to a signal line it is always necessary to ensure that the data transmitter unit does not transmit data in such a manner as will interfere with the other traffic on the signal line. This form of controlled transmission of data on the signal line can be obtained in a variety of ways, many of which are well-known; an example is the well-known "token pass" system which is used in a large number of local area networks. This known method of controlling the access to the signal line relies upon the circumstance that the individual data transmitter units transmit data only when having been so allowed by reception of a token pass which circulates among the data transmitter units coupled to the signal line.

This form of control of the access to the signal line entails that part of the traffic on the signal line is used exclusively for controlling the access of the individual data transmitter units to the signal line. This limits the effective bandwidth of the signal line. And, further, the data transmitter unit can transmit only when it receives the token and not just determined by the need for transmitting data.

Another known method of controlling the access to a signal line comprises causing the transmitter to check whether the line is idle, and in response to the line being unoccupied transmitting a pulse train on the line while listening on the line to decide whether the transmitted pulse train collides with another pulse train on the signal line. In case of collision, the transmission is repeated a predetermined period of time after the first attempt at transmitting the pulse train. This sequence is repeated until the pulse train is transmitted without collision. This method is dependent upon presence of synchronization data in each pulse train, owing to collision detections and owing to the transit time of the signal. This entails that the data amount transferred decreases with the length of the signal line. Another important drawback is that the number of data transmitter units which can be coupled to the signal line is limited since the number of collisions may increase to a level where the bandwidth approaches zero because of collisions.

The object of the present invention is to provide a method and an apparatus for controlling the access of a data transmitter unit to a signal line, thus making it possible to utilize the bandwidth of the signal line approximately fully for data transfer, to avoid collisions, to make the data amount transferred independent of the length of the signal line, and to ensure access to the signal line when the data unit wants to transmit.

By controlling the access to the signal line in response to said line having been unoccupied for a period of time corresponding to the duration of the data amount to be transmitted on the signal line, it is possible for several successively positioned data transmitter units to fill the entire length of the signal line with pulse trains.

When additionally, the transmitting point of time of the data transmitter unit is controlled by the signal line being idle and by occurrence of an enabling signal, it is possible from a central location to produce simultaneous or sequential transmission of data from several data transmitter units.

When a synchronization signal generator is associated with each data transmitter unit, and when this synchronization generator is controlled by a common synchronization signal, it is possible for the individual data transmitter units on the signal line to transmit at predetermined points of time. When, thus, the transmission time is associated with a common synchronization source while the transmission is still conditional upon the signal line being idle, synchronous data transfer may be established between two transmitter units.

Since the individual data transmitter units always check whether the signal line is idle for a period of time corresponding to the duration of the pulse train to be transmitted, it is possible, to connect different data transmitter units to the same signal line. This permits mixing of different forms of data transmission on the same signal line. This provides significant advantages because it will be possible e.g. to mix telephone, video and terminal transmissions over the same signal line.

In addition to mixing the various transmission forms by using various data transmitter units, it is also possible to construct the data transmitter units in such a manner that transmission control can place differently in a transmitter unit. Further, it is also possible, to let the data transmitter units transmit pulse trains of varying length.

It is possible to couple a synchronous connection between two transmitter units, the first transmitter unit transmitting a first pulse train which contains information to the receiver to the effect that the subsequent pulse trains will be transmitted in response to a time controlled activation signal, and that it is expected that the acknowledgment of the transmitter will occur in response to the same activation signal or another time controlled activation signal which is synchronous with the first time controlled activation signal. Two signalling forms are used in this coupling of a real time connection between the two transmitters, the first "call" to the receiver taking place asynchronously and the further traffic between the two transmitters being synchronous.

It is also possible according to the present method just to transmit pulse trains on the data transmitter unit when the signal line is idle, without the transmitter expecting to receive an acknowledgement.

It is also possible that the first pulse train from a transmitter indicates to the receiver that a special type of information transfer is involved, and how the transmitter expects the receiver to process the data transferred. The data transmitter unit will then not continue to transmit until the receiver has confirmed its readiness to receive the stated transfer type. The last transmitted pulse train of the transmitter will then indicate to the receiver that the information transfer is completed, and the selected receiver will then be free to take part in other data transfers.

The present invention will be described more fully below with reference to the drawing, in which FIG. 1 is a block diagram of an apparatus according to the present invention, FIG. 2 is a block diagram of a second embodiment of the apparatus shown in FIG. 1, FIG. 3 shows in outline how several data transmitter units and an activation signal generator are connected to the same signal line, FIG. 4 shows an example of how a pulse train from a data transmitter unit may be arranged, FIG. 5 shows in outline how data are transmitted without acknowledgement, FIG. 6 shows how a connection is established with information on the data transfer type, and FIG. 7 shows in outline how a connection is established, it being desired to synchronize the incorporated transmitters in time.

Figure 1:
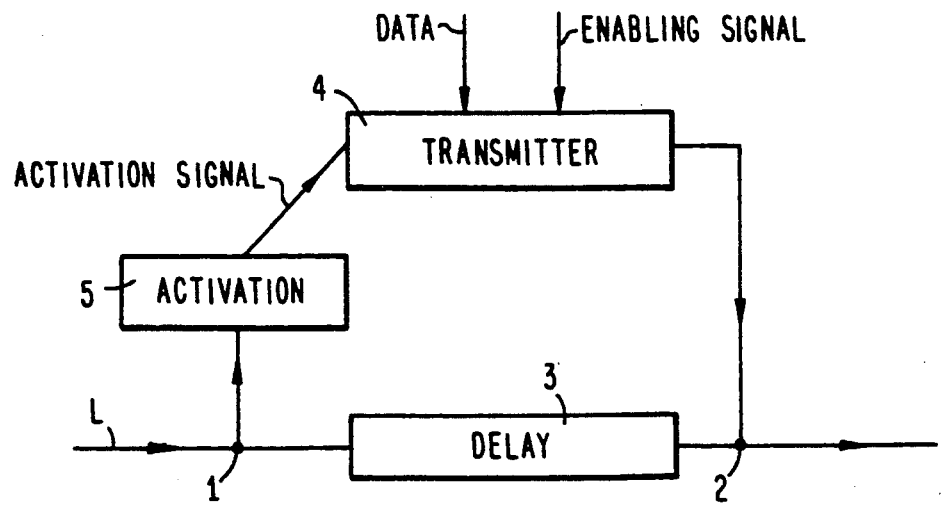

FIG. 1 shows a block diagram of the transmitter unit of the invention. A signal line L is connected to the input 1 of the apparatus, and the signal line continues to the output 2 of the apparatus. A signal delay link 3 is inserted between the input and output of the apparatus. A data transmitter unit 4 has its output connected to the output 2 of the apparatus. The data unit comprises a data input, an enabling signal input and a third input which is connected to a detection circuit 5. The input of the detection circuit 5 is connected to the input 1 of the apparatus. The detection circuit 5 is adapted to detect the state of the signal line and to apply an activation signal to the transmitter unit 4 when the signal line has been idle for a predetermined period of time. This period of time depends upon the duration of the pulse train the transmitter unit wants to transmit. This period of time cannot be longer than the signal delay inserted between the input 1 of the apparatus and its output 2, said signal delay being provided by the delay element 3.

When the transmitter unit 4 has received data and enabling signals, the detection circuit 5 checks the signal line L, and when this has been idle for a period of time corresponding to the duration of the data to be transmitted, the transmitter unit 4 is then activated; following which data are transmitted on the signal line L. It will be understood from the foregoing that the correct function of the data transmitter unit depends upon data propagating only in one direction on the signal line (from left to right in FIG. 1). However, in principle, nothing prevents the apparatus from being so constructed that the state of the signal line is checked on both sides of the time delay element 3. However, such a double-directed data transfer on the signal line L does not improve the signal transfer rate; in contrast, the data transmitter units and the data receiver units will be considerably more complicated. The data transmitter unit shown in FIG. 1 transmits data in sole dependency upon an enabling signal and in response to idleness on the signal line L. The shown enabling signal does not have to appear from a unit outside the data transmitter unit, but may be provided by the data transmitter unit itself when it has received a sufficient amount of data. The enabling signal, which is then produced automatically in the data transmitter unit, must then be removed when the received data have been transmitted since, otherwise, the data transmitter unit will perform repeated transmission of the same data on the signal line each time there is idleness for a period of time of sufficient duration on the signal line.

Figure 2:
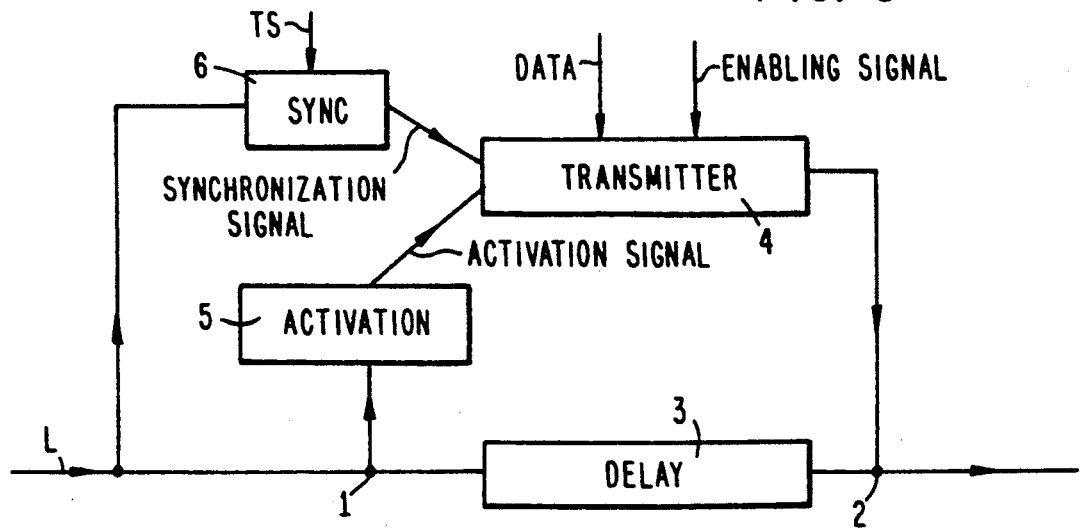

FIG. 2 shows another embodiment of the data transmitter unit, and units which are the same as in FIG. 1 have been given the same reference numbers. Unlike the data transmitter unit shown in FIG. 1, the data transmitter unit of FIG. 2 comprises a synchronization unit 6. The input of the synchronization unit 6 is connected to the signal line L, and its output is connected to the transmitter unit 4. The synchronization unit 6 is adapted to receive synchronization pulses, in the embodiments shown over the signal line, and to apply synchronization signals to the data transmitter unit. The synchronization signals applied by the synchronization unit to the data transmitter unit 4 are synchronous in terms of time with the synchronization pulses received over the signal line. The length of time between the moment when the synchronization unit 6 receives a synchronization pulse over the signal line and the moment when a synchronization signal is applied, can be controlled by transferring data to the synchronization unit 6 via the line TS. Thus, it is possible for a unit wanting to transfer data through the data transmitter unit to select a propagation time by indicating the necessary data over the line TS. The transmitter unit 4 is adapted to transmit data only in case of coincidence between a synchronization signal from the synchronization unit 6 and from the detection 5. Thus, data cannot be transmitted at a time where the signal line is occupied.

If data transmitter units of the type shown in FIG. 2 are used, it is possible for another data transmitter unit to transfer data on the transmission point of time on the transmission line L to another data transmitter unit associated with the receiver unit (not shown), and the transmission point of time thus transmitted may then be transferred to the synchronization unit 6. This makes it possible to permit two transmitter units to transmit synchronously on the signal line, and it is therefore possible to build a synchronous communication path between two associated transmitter/receiver units on the signal line L.

It is shown in FIG. 2 that the synchronization unit 6 receives its synchronization pulses over the signal line L. This is a particularly advantageous embodiment, since it compensates for the propagation time of the synchronization pulses to the individual transmitter units. However, it is also possible to allow the synchronization pulses to arrive at the synchronization units 6 in the various data transmitter units in another manner, e.g. by connecting a central synchronization pulse source hard wired to each individual synchronization unit 6.

Figure 8:
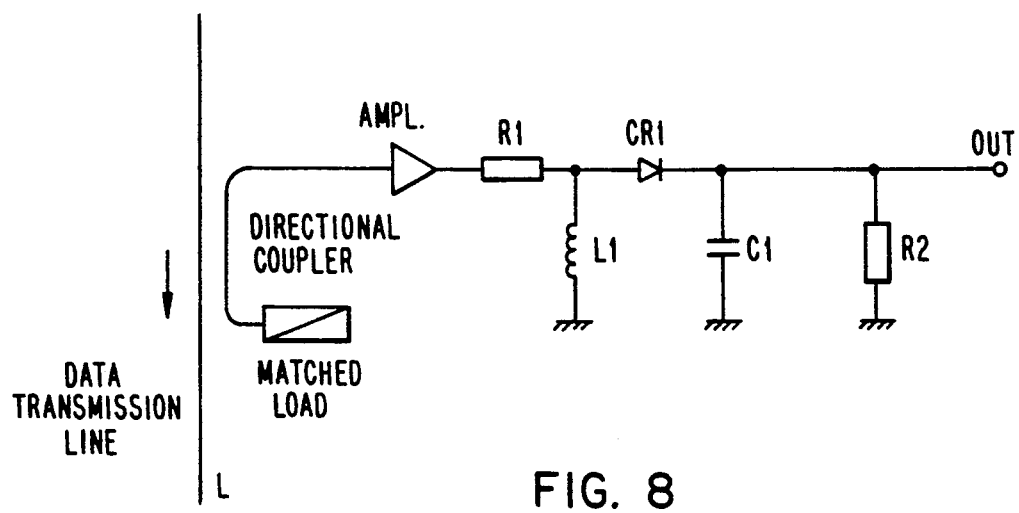
FIG. 8 shows a preferred embodiment of the detection means shown in FIGS. 1 and 2.

The detection circuit 5 shown in FIGS. 1 and 2 can be realized by the circuit shown in FIG. 8 which is coupled to the data transmission line L via a directional coupler transferring part of the effect on the transmission line L to the input side of the activation circuit, where a matched load prevents reflections. The signal is amplified in an amplifier AMPL, where it is imparted with the requisite signal amplitude. The signal drawn from the data transmission line L is subsequently rectified and smoothed, and a voltage level is generated on the output of the detection circuit 5. The output of the amplifier AMPL is connected to a resistance R1, the second terminal of which is connected to earth through an inductance L1 and to the output terminal OUT of the circuit through a diode CR1. The output terminal OUT of the circuit is furthermore connected to earth through a parallel connection having a capacitance C1 and a resistance R2.

The inductance L1 DC-decouples the input terminal of the diode CR1; as a result, a possible DC-voltage is not transferred to the output terminal OUT of the circuit. When a burst passes the directional coupler, flagbits will charge the capacitance C1 through the resistance R1 and the diode CR1. A first time constant R1C1 determines the amount of bits to be received before the output terminal OUT assumes a high voltage level. Another time constant R2C1 determines for how long the output terminal OUT remains high after receipt of the last bit. In the preferred embodiment the first and the second time constant R1C1 and R2C1 have been so chosen that two consecutive bits will cause the output terminal OUT to assume a high level, i.e., R1C1=2T, where T corresponds to the duration of one bit, and so that the output terminal OUT of the circuit will remain high for a period corresponding to the delay in the delay element 3 (FIGS. 1 and 2), R2C1=delay.

The voltage level VOUT of the outlet terminal OUT of the circuit is compared in a comparator, not shown, with a predetermined threshold value. If this threshold value is transgressed, the comparator does not give off any activation signal, and the transmitter cannot be reactivated to perform a new transmission cycle transmitting a new data frame.

The delay unit shown in FIGS. 1 and 2 may e.g. have a delay within the range one data frame, with e.g. 8 bursts of 12 bits each. At a data transmission frequency of $f=1/T=2.40$ GHz, this corresponds to a delay of Tframe=40 ns, which e.g., can be implemented by a coaxial cable, the length of which is calculated by:

$$lcable = c\, Tframe\, \sqrt{\sigma r}\,,$$

where c is the speed of light in a vacuum, and $\sigma r$ is the relative dielectric constant of the insulator in the coaxial cable.

With $\sigma r=2.25$ we obtain lcable=8.00 m.

It is of course possible to obtain a corresponding delay using an arbitrary signal propagation path, which may be a microstrip, optical fibre etc.

The transmitter 4 may be an arbitrary transmitter, and may e.g. in known manner comprise a power supply, supplying an oscillator, a control unit and an amplitude modulator.

Figure 9:
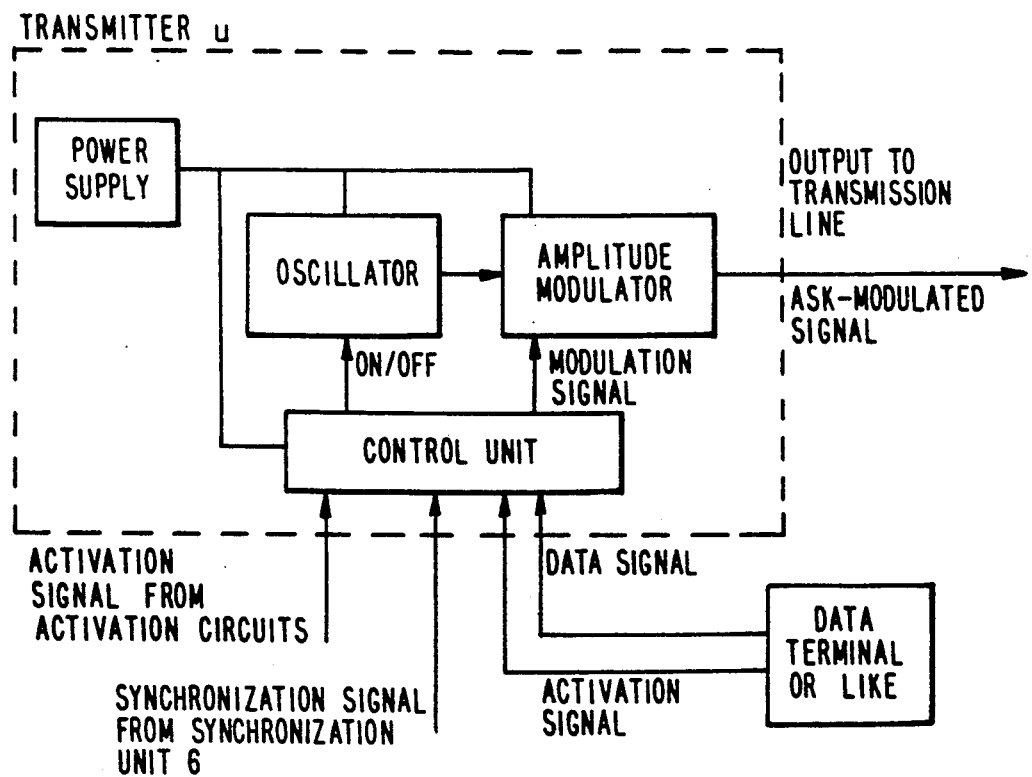
FIG. 9 shows a preferred embodiment of the transmitter shown in FIGS. 1 and 2.

The oscillator generates a sinusoidal signal which is ASK-modulated in known manner in dependency upon the incoming data. When a data terminal or the like wishes to transmit data it gives off the Activation Signal shown in FIGS. 1, 2 and 9 to the transmitter 4. When the control unit in the transmitter 4 further receives an activation signal from the detection circuit 5, as an indication that the transmission line L is idle, the oscillator is started and a data transmission is initiated, which continues until the activation circuit detects a signal on the transmission line L, upon which the data transmission is stopped.

If the control unit of the transmitter 4 furthermore is connected to a synchronization unit 6, the data transmission is not initiated until data terminal has indicated that it wishes to transmit data, the detection circuit 5 has indicated that the transmission line L is idle, and the synchronization circuit has detected the synchronization pulses, so that data can be transmitted in immediate continuation thereof.

Figure 10:
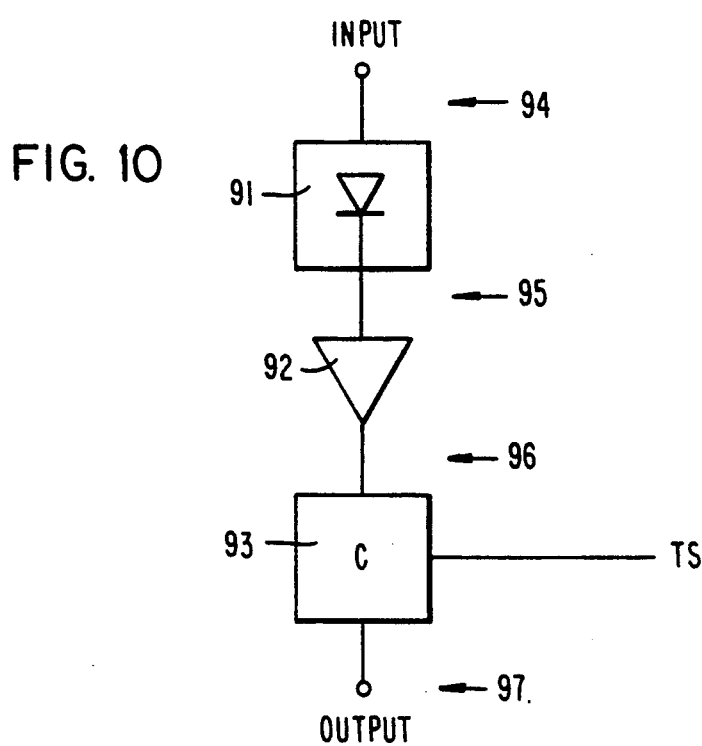
FIG. 10 shows a preferred embodiment of the synchronization unit shown in FIG. 2.
Figure 11A:
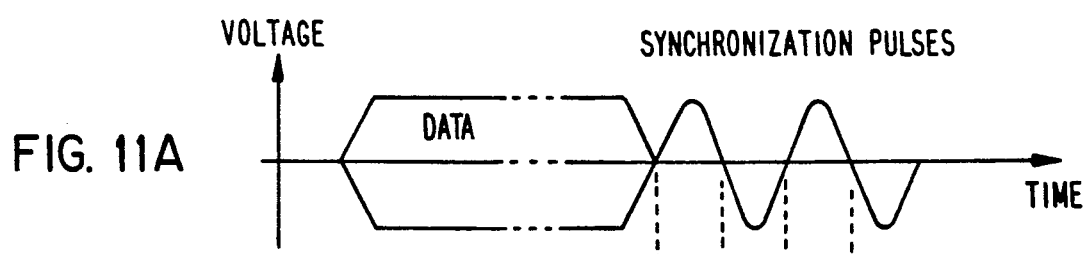
FIGS. 11A-11B show the synchronization pulses and data as a function of time and indicates the detection principle of the synchronization unit.
Figure 11B:
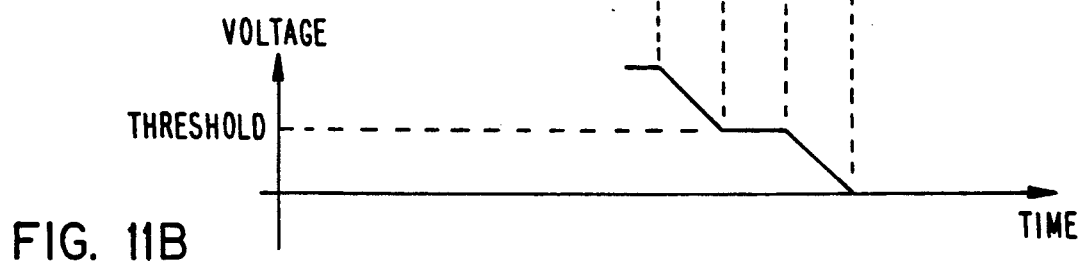

The synchronization circuit shown in FIG. 2 may be realized by the diagram shown schematically in FIG. 10. A signal sample from the transmission line L is decoupled from the data transmission line L in the same way as in the detection unit 5. In dependency upon the nature of the transmission line this signal may be an RF-signal being passed to an input 94 of an envelope detector 91 converting the RF-signal into a video signal which is then passed to an input 95 of an amplifier 92. The amplifier 92 then amplifies the video signal so as to give off a stronger video signal on an outlet 96, thus making it possible for the amplitude of the amplified video signal to attain a predetermined level. The amplified video signal is passed to the input of a comparator 93 which compares the signal level with a predetermined threshold value and implements a DC-level on the output 97. The DC-level of the output 97 is passed to the transmitter 4 to indicate whether synchronization pulses have been detected on the transmission line L. Besides the comparative operation the comparator 93 performs an integrating function being shown in FIG. 11, where diagram A shows the voltage as a function of time on the input 96. Diagram B shows the voltage as a function of time on the outlet 97. The comparator 97 is adapted to rectify the synchronization pulses and to integrate the rectified voltage. The threshold value is selected in dependency upon the number of synchronization pulses, and is governed by signal TS, which e.g. may be generated in the synchronization unit 7.

In the embodiment shown in FIG. 2, the detection circuit 5 senses whether the transmission line L is idle. The synchronization unit 6 detects synchronization pulses on the transmission line L, which makes it possible to transfer data by the transmitter 4 when the detection circuit 5 senses that the transmission line L is idle and the synchronization circuit 6 has detected synchronization data immediately upon the detection of synchronization pulses to perform synchronous data transmission.

Figure 3:
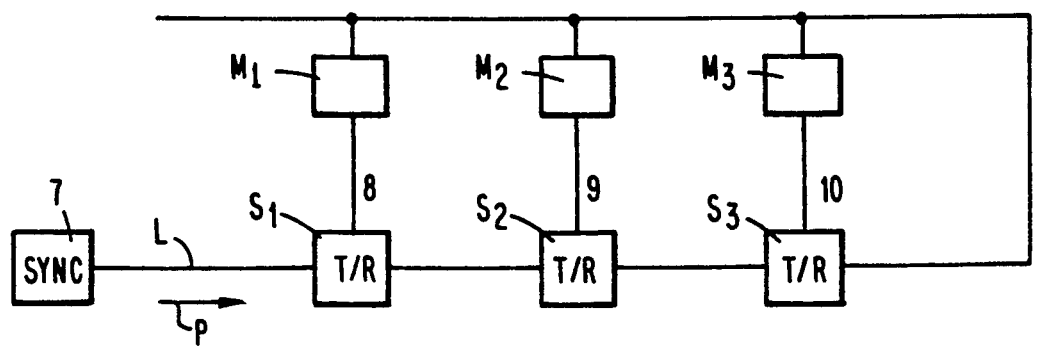

FIG. 3 shows in outline how it is possible to build a data transmission network with data transmitter units of the type shown in FIGS. 1 and 2, and receivers adapted to receive the pulse trains transmitted by the data transmitter units. The data transmitter units and the data receiver units will not be described more fully here because these can be built in any known manner for transmission and for reception of serial flows of data, and the signals which may be used on the signal line L may be digital as well as analog. FIG. 3 shows a data transmission network comprising a transmission line L, a synchronization pulse source 7 connected to the starting point of the signal line L, and three data transmitter/receiver units 8, 9 and 10. The data transmitter units may be arranged as described above, i.e. both for transmission of data in sole response to silence on the signal line, or for transmission of data in response to silence on the line and an activation signal, which may be produced by circuits which are external with respect to the data transmitter unit, or in response to a synchronization signal which is fed to the data transmitter unit. The signal line L is unidirectional in the direction of the arrow P.

The synchronization signal source 7 is connected to the starting point of the signal line L, so that the synchronization signal source always has first priority to transmit synchronization pulses on the signal line because no data transmitters are positioned before it which can occupy the signal line in the period of time where the synchronization signal source 7 wants to transmit synchronization signals. Of course, it is possible to place the synchronization signal source elsewhere on the signal line L, but this will involve considerable drawbacks since it will not be certain that the synchronization pulses can be transmitted on the signal line at any desired time.

With the shown structure of the data transfer system, each transmitter unit can communicate with all receivers. Therefore, it is necessary that the pulse train transmitted from a transmitter unit contains information on which receiver unit the transmitted information is intended for. FIG. 4 shows an example of the structure of such a pulse train. It appears from FIG. 4 that the pulse train is divided into three separate parts, an address part ADR, a transfer formation part OVF and a data part DATA. The address part contains information on which receiver is to receive the pulse train transmitted, the transfer part contains information on which transfer type is involved, and the data part contains the data to be transferred. Each individual data transfer may consist of one or more such pulse trains, and, in response to the information contained in the transfer part, the receiver can activate its transmitter part to produce acknowledgement of the data transferred. It will be described below how the traffic may be organized on the signal line by means of the various forms of data transmitter units.

FIG. 5 shows schematically how the information transfer takes place when the transmitter does not expect acknowledgement from the receiver. The data transmitter unit 4 receives data from the surroundings in the form of the data words 1 to n. These data words are combined to a pulse train 11 which is transmitted via the signal line L. The addressed receiver catches the pulse train and divides the pulse train again into the individual words 1 to n. Data may be transferred in this manner from a transmitter unit to a receiver without communication between the transmitting and the receiving unit being necessary. The transmitter unit transmitting the pulse train composed of individual words may e.g. be adapted to collect a predetermined number of words, following which it automatically transmits the pulse train on the signal line when said line is idle.

If a greater degree of control is desired in the information transfer, this may be effected as outlined in FIG. 6 Here, the transmitter unit first transmits a connection inquiry which is answered by the receiver unit with a connection acknowledgement 13. The transmitter unit only waits a predetermined period of time for the acknowledgement from the receiver; if such acknowledgement is not received, the transmitter tries perhaps a plurality of times to establish connection, or the system connected to the data transmitter unit is informed that connection cannot be established. When the connection is acknowledged, the transmitter transmits the first data pulse train 13 in a series of pulse trains, and the receiver checks all the time that the pulse trains are received within a predetermined period of time; if this does not happen, the receiver may either communicate this to the transmitter or perform other acts ensuring that the received data, which will then be incorrect, are not used. When the transmitter unit has transmitted the last pulse trains 14 containing data, a pulse train 15 is applied to the receiver, indicating that the connection is now to be disconnected. The receiver responds to this information by acknowledging the disconnection 16. In this final phase both transmitter and receiver check that the information transfers take place within a predetermined period of time. This ensures that a connection will always be disconnected, even if parts of the information are missing. It is ensured in this manner that the receiver is not blocked by uselessly established connections.

Figure 7:
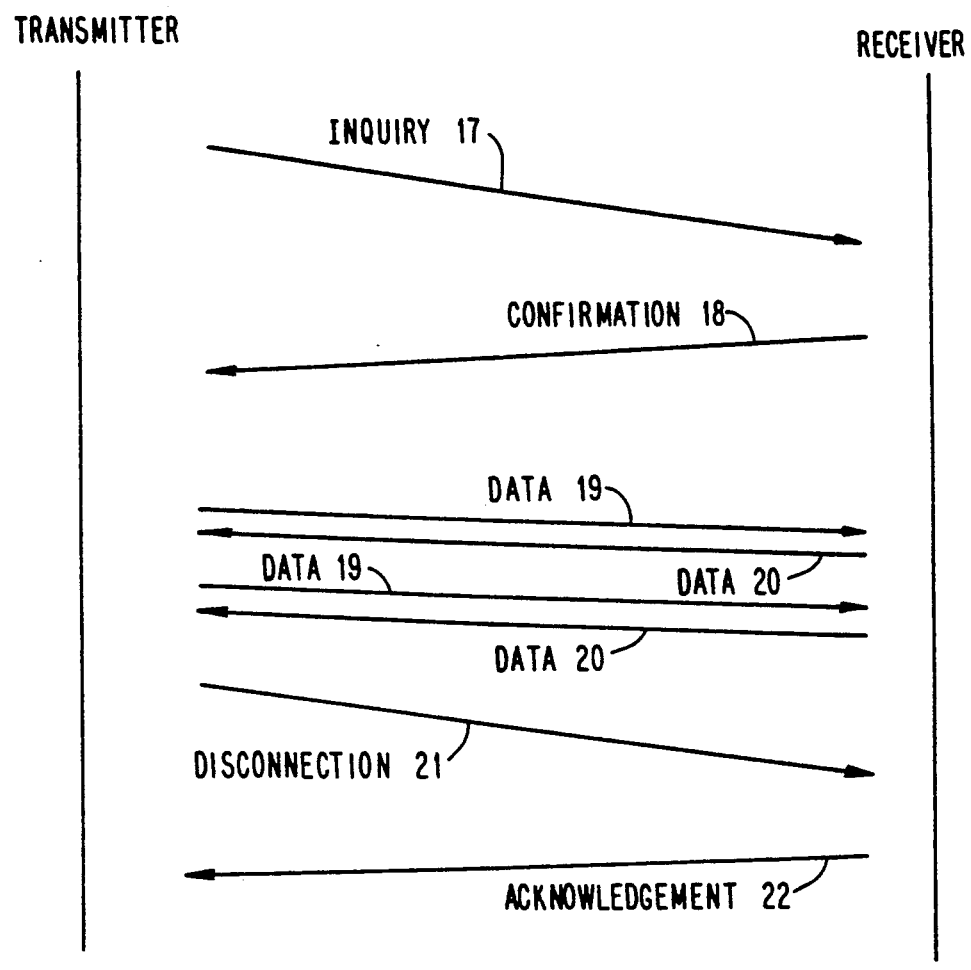

As mentioned in connection with the description of FIG. 2, it is also possible to effect synchronous data transfer by means of the transmitter units described. This takes place in the manner schematically shown in FIG. 7. The transmitter transmits a connection inquiry 19 containing information on the receiver with which connection is desired, and information on the point of time at which the transmission are to be synchronized. The receiver responds with a confirmation 18 that the information transferred has been received correctly. Then the two units communicate with each other alternately by transmitting the data pulse train 18, 19 and 20 to each other, the pulse train transmission points of time being determined by the information indicated at the establishment of the connection. The connection is disconnected in that the transmitter transmits a pulse train 21 to the receiver, containing information to the effect that the connection is to be disconnected, and the receiver confirms this to the transmitter by transmitting a pulse train 22 containing information on disconnection of the connection.

The traffic between the transmitter and the receiver is monitored continuously in that both transmitter and receiver expect to receive pulse trains within predetermined periods of time, and if this does not happen, both transmitter and receiver take steps to disconnect the connection. This prevents the receiver from being locked by an established connection which is no longer active.

The data transmitter units shown in FIGS. 1 and 2 may also be adapted to transmit pulse trains continuously when the detection circuit 5 has detected the first time that the signal line L has been idle for a predetermined period of time, and to interrupt the transmission of pulse trains only when detection circuits 5 register that the signal line L is again busy.

This enables transmission of large amounts of data over the signal line, it being just necessary that the first pulse train contains information on the receiver and the type of transfer, and the other pulse trains exclusively contain data. When it is detected that the signal line is occupied, the data transfer terminates with a pulse train containing information on how much has been transmitted, so that the receiver can detect that the transmission is interrupted. When the signal line is again idle, the data transmission may be resumed in the manner just described. This data transfer control can advantageously be used in transfer of the type described in connection with FIGS. 5 and 6.

Thus, it will be realized that the communication between the individual units on the signal line is controlled exclusively by the transmitter units and with which receiver units these will communicate, and which type of communication the transmitter unit will establish between itself and a selected receiver unit.

When various transmitter units or transmitter units controlled differently are associated with the same signal line, it is possible to transfer varied traffic on the same signal line. For example, a video image may be transferred in that the transmitter, in response to the occurrence of a line synchronization pulse, transmits a pulse train containing a digitalization of an entire line. This transmission of information is controlled exclusively by the transmitter and by the signal line being unoccupied; the receiver will then receive the image line by line, and it poses no difficulty to reconstruct the entire image since the synchronization pulse is maintained in the line data transferred. Between these pulse trains containing image information, it is then possible to execute data transfer between a transmitter and a receiver, where the transmitter may e.g. be associated with the central computing unit of a computer and the receiver may be associated with a disc store; here the transmitter may establish a connection to the disc store and transfer the entire content in a buffer before the connection is disconnected. At the same time, a third transmitter unit may establish a synchronous connection to another receiver to transfer a double-directed digitalized audio signal, which may e.g. be a telephone conversation.

The combination of these transmission types on a common signal line presupposes of course that transmission is effected at such a high rate that the bandwidth is sufficiently great. With a suitable embodiment of the transmitters and the receivers it is possible today to obtain a bandwidth above 2 GHz, and this bandwidth is sufficient for establishment of a very large number of the stated connections on the same signal line.

I claim:

1. A method of coupling a data transmitter unit in series with a signal line, said data transmitter unit being controllable to transmit data in the form of a pulse train, comprising the steps of:
    applying the pulse train to a data input of said data transmitter unit;
    applying signals from said signal line to a serial input of said transmitter unit;
    delaying for a predetermined period of time corresponding at least to the duration of said pulse train, propagation of said signals from the serial input of the data transmitter unit to an output thereof along a signal flow path external to said unit;
    checking whether the signal line on the serial input of the data transmitter unit is idle; and
    if the signal line is from a starting time idle for a period corresponding to said predetermined period of time, activating the data transmitter unit to initiate transmission of the pulse train on the output of said data transmitter unit at a time which lags at least by said predetermined period of time with respect to the starting time.

2. A method according to claim 1, including the step of controlling the time of transmission of the data transmitter unit by detecting a coincide between the signal line being idle for said predetermined period of time and an enabling signal.

3. A method according to claim 1, including the step of connecting a synchronization signal generator to the signal line for generating a synchronization signal, and further including controlling the time of transmission of the transmitter unit by detecting a coincidence between the signal line being idle for said predetermined period of time and said synchronization signal, and synchronizing an activation signal from an activation signal source with said synchronization signal on the signal line.

4. A method according to claim 1, including connecting a plurality of data transmitter units to the same signal line, and exclusively controlling some of said transmitter units to transmit by the signal line being unoccupied for said predetermined period of time, while controlling others by at least one activation signal applied thereto to transmit when said signal line is idle for a period of time corresponding to said predetermined period of time.

5. A method according to claim 1, including the step of controlling said data transmitter unit to transmit when both the signal line is idle for said predetermined period of time and an enabling signal is received from an enabling signal source.

6. A method according to claim 2, including the step of controlling the data transmitter unit to transmit pulse trains of different lengths.

7. A method according to claim 1, including the step of transmitting a first pulse train from said transmitter unit to a receiver which contains information that the transmitter unit will subsequently transmit in response to an enabling signal applied to said transmitter unit from an enabling signal source, and that further information transfer between the transmitter unit and the receiver is to take place synchronously with an activation signal received by the transmitter unit from an activation signal source when said signal line is idle for a period of time corresponding to said predetermined period of time so as to obtain synchronous signal transfer between the transmitter and the receiver.

8. A method according to claim 1, including the step of transmitting a pulse train from said data transmitter unit without expectation of an acknowledgement from a receiver unit on the signal line.

9. A method according to claim 1, including the steps of incorporating in a first pulse train from the data transmitter unit a flag characterizing the type of information being transferred therefrom to the serial signal line, delaying another data transfer from said transmitter unit until a selected receiver has confirmed (1) that the first pulse train and the type of information being transmitted characterized thereby for a current data transfer have been received, (2) that the final pulse train sent by the transmitter unit for a current data transfer contains information on the completion of the transfer, and (3) that the final pulse train in a current data transfer has been received by said receiver.

10. A method according to claim 1, including the steps of controlling the data transmitter unit to cease transmission of pulse trains only when the signal line is again occupied, and wherein the last pulse train transmitted from the data transmitter unit contains information on completion of the transfer.

11. An apparatus for coupling data on a serial signal line and having a serial input, comprising:
    signal delay means inserted between the serial input and an output of the apparatus, for delaying an input signal, received on said serial input,
    transmitter means having an activation input, and having a data input for receiving a data signal to be transmitted on the serial signal line, and a data output, said data input and said data output of said transmitter means being connected, respectively, to a data source and said output of the apparatus, and
    detection means connected to the serial input of the apparatus and to said activation input of the transmitter means and responsive to signals on the serial signal line for sending an activation signal, when the signal line has been idle for a predetermined period of time, to the activation input of said transmitter means for activating the transmitter means to propagate said data signal applied thereto at said data input, the signal propagation time from the serial input of the apparatus to its output through said signal delay means being not less than the duration of said data signal, so that said data signal can be transmitted without interruptions when said input signal is received on said serial input of the apparatus.

12. Apparatus according to claim 11, wherein the transmitter means is adapted for receiving enabling signals from an enabling signal source, said transmitter means, in dependency of coincidence between an enabling signal and an activation signal from said detection means, also being adapted for transmitting a pulse train.

13. Apparatus according to claim 11 including synchronization means synchronized to an external synchronization signal transmitted over the signal line for generating a synchronization signal, wherein the data transmitter is adapted for transmitting a pulse train by coincidence between an activation signal from the detection means and a synchronization signal from the synchronization means.

* * * * *